Patented Aug. 12, 1924.

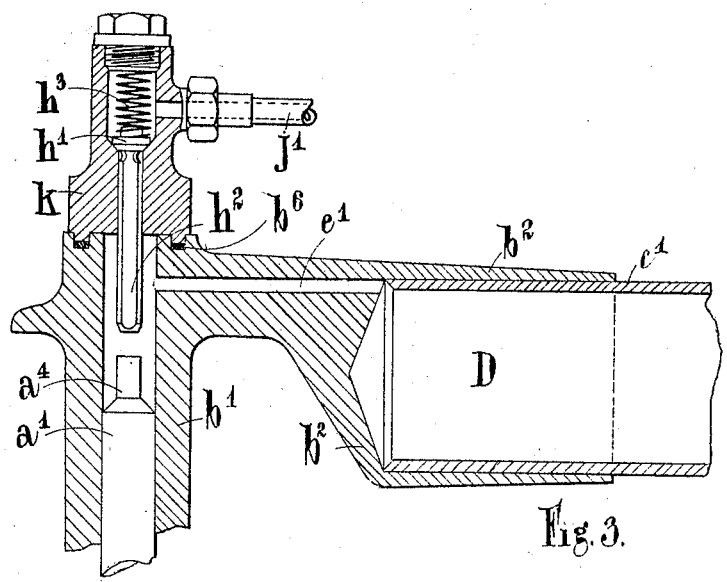
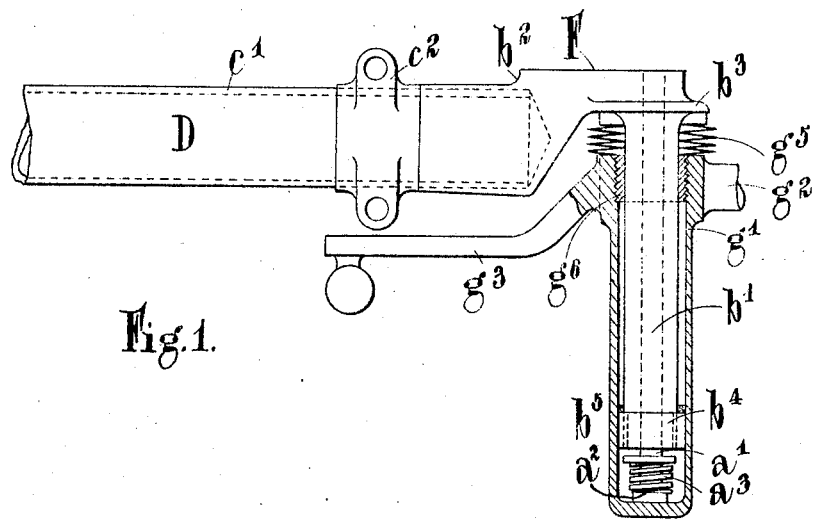
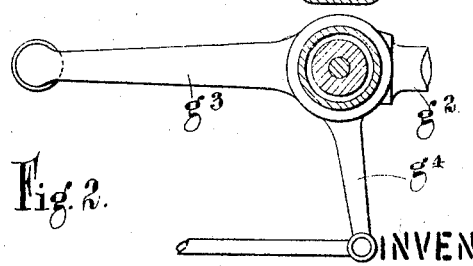

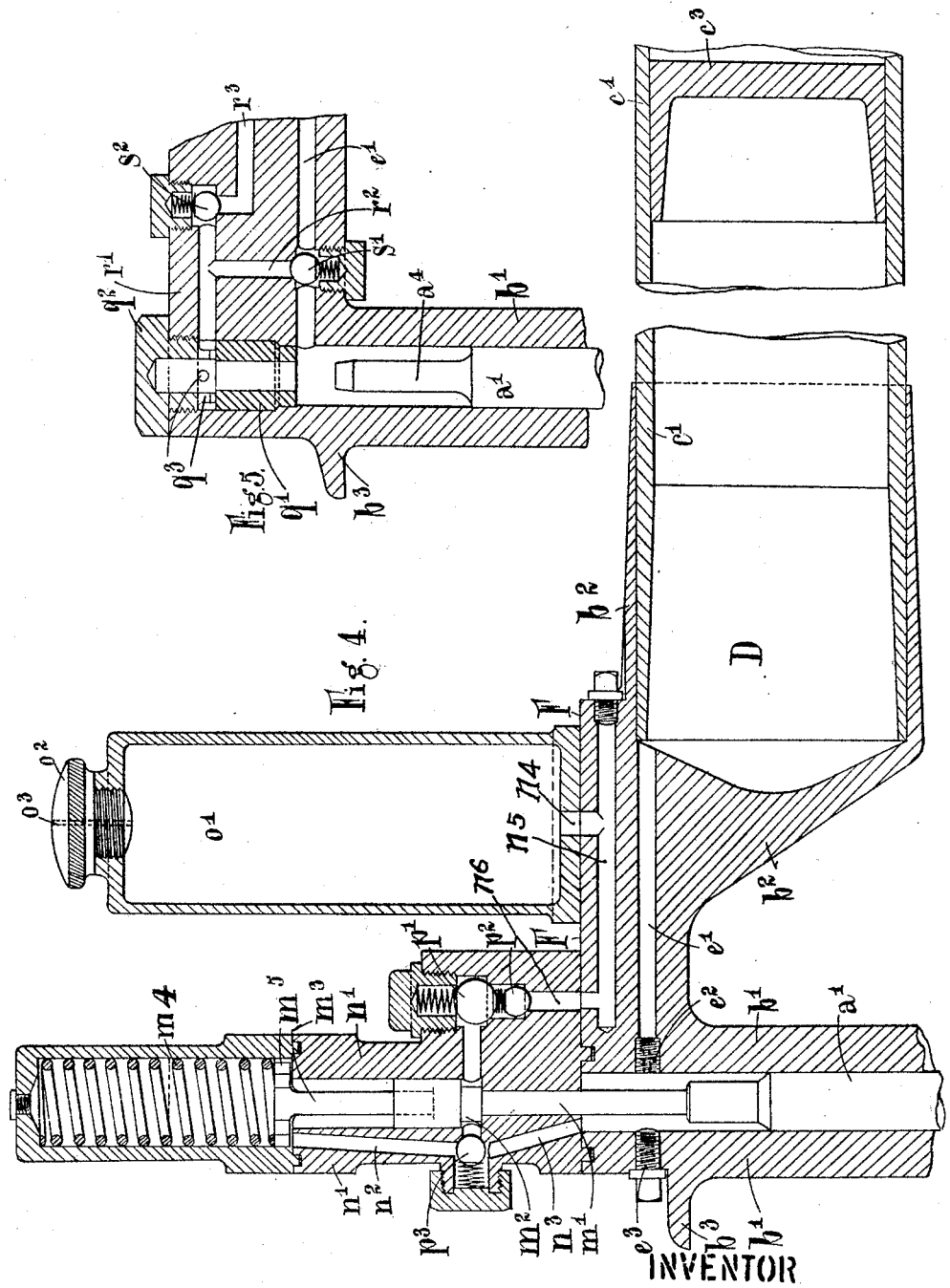

1,505,036

UNITED STATES PATENT OFFICE.

FREDERICK WILLIAM LANCHESTER, OF LONDON, ENGLAND.

VEHICLE SPRING.

Application filed October 23, 1918. Serial No. 259,452.

*To all whom it may concern:*

Be it known that I, FREDERICK WILLIAM LANCHESTER, a subject of the King of Great Britain and Ireland, and residing at 41 Bedford Square, London, W. C. 1, England, have invented certain new and useful Improvements in Vehicle Springs, of which the following is a specification.

The present invention relates to an improved system of springs for vehicles, and has for its object to do away with the employment of steel springs and to enable any desired degree of damping to be readily introduced.

It consists in brief in the employment of liquid in compression as an elastic medium for absorbing road shock.

It further consists in a means and mechanism for employing liquid in compression as an elastic medium and as a means of damping in the springing or suspension of vehicles.

It further consists in hydraulic or compressed liquid suspension apparatus for road or rail vehicles comprising a specialized pump or replenisher, actuated by the motion of the suspension itself, in such manner as to automatically generate and maintain the pressure required.

It further consists in compressed liquid suspension apparatus for road or rail vehicles comprising a replenisher in which a replenishing piston is rendered functionally operative by the main pressure ram or plunger when the extent of motion passes a certain pre-arranged limit.

It further consists in the springing or suspension mechanism hereinafter described.

In one mode of carrying the present invention into effect as applied to the suspension of an automobile road vehicle the load at each suspension point, the latter commonly four in number, is taken by a ram or plunger working in a vertical or nearly vertical cylinder the pressure space communicating with a hydraulic compression chamber filled with a liquid such as mineral oil in a state of compression, and by the compressibility of whcih the freedom of suspension is controlled or constrained.

Taking more particularly by way of example the front wheel suspension of an automobile road vehicle the usual axle in common is done away with, and in its place a cross member is fitted as a rigid part of the chassis. Each wheel is mounted independently on a short stub axle formed as one limb of an "L" shaped stamping, whose other limb forms a vertical or nearly vertical pivot. The pivot limb is allowed sufficient range of sliding movement in its bearing to take up the inequalities of the road, and is fitted with a hydraulic ram of comparatively small diameter working in a cylinder which is in communication with a pressure chamber of considerable volume. It is desirable to use high pressure in order to minimize the volume and weight of fluid carried. If for example the area of the ram be calculated on the basis of one ton per square inch the displacement volume will be twice as great as if it be calculated on a basis of two tons per square inch and the reservoir volume will need to be four times as great. Assuming one ton per square inch as the pressure to be employed, as calculated on the static load, the volume of the reservoir requires to be about one hundred times the normal (static) ram displacement.

Oil pressure may be pumped up and maintained by engine power in a suitable reservoir or by power taken off a road wheel axle to about double the normal pressure necessary to support the static load, and in this case the ram is arranged to trip open a valve or uncover a port to admit liquid from the said pressure supply at or near the top of its range, that is to say in fact when the vehicle (or that part of it concerned) is at the lowest point of an oscillation.

It is well understood that the periodicity of a suspension is related to the initial linear yield of the resilient system under load. It is usual to allow a suspension range to total about twice this amount, so that the maximum load on any suspension point for which provision is made is about double the static load. If the oil pressure system is maintained as stated at twice the static load these conditions will be automatically complied with by the apparatus described. It is understood however, that the proportions of the springing and the supply pressure employed may be varied in accordance with the requirements of the design and to suit varying circumstances.

In order to secure any desired degree of damping a restricted aperture may be provided between the cylinder and the fluid compression reservoir. This aperture may be arranged so that it may be regulated by a valve from without.

The pressure diagram of a fluid pressure system closely resembles that of a steel spring; it may be regarded for the present purposes as a straight line. It is however subject to the well understood laws of thermodynamics. During the compression of the liquid up to the point at which the communication valve is opened or communication port uncovered the pressure increases approximately as the ram displacement. In order to avoid the loss of augmentation which would otherwise take place when the said valve or port is opened a non-return valve may be fitted to prevent the liquid being forced back into the pressure supply system. In order to prevent the over-running of the ram and injury to the mechanism a buffer may be fitted to the suspension as is frequently done in the present day suspensions in which steel springs are used.

In place of the mechanically driven hydraulic pump as a means of supplying liquid under pressure at the top of the main cylinder, and preferably axial therewith, a replenisher cylinder may be arranged of comparatively short stroke adapted to be actuated by the ram or plunger itself. Passing through a partition between the replenisher cylinder and the main cylinder is a rod adapted to be actuated by the main ram if, in its relatively upward stroke, it passes a predetermined point. A secondary piston rod passes through an aperture in the cover of the replenisher cylinder, and is acted upon by a spring, by which the replenisher piston is normally maintained in its lowermost position. The spring box is in permanent communication with the main suspension cylinder and hydraulic pressure reservoir so that, so far as the general hydraulic pressure is concerned, the piston is approximately in equilibrium.

The replenisher piston takes in oil on its under side from a supply reservoir and pipe and passes this on its down stroke through a lift or ball valve to its upper side. The valves connected with the replenisher are of the ordinary lift type.

The accompanying two sheets of diagrammatic drawings serve to illustrate by way of example an application of the present invention to the front axle suspension of an automobile road vehicle. With reference to these:—

Figure 1 is a section through a wheel axle and swivel head in which the present invention is employed.

Figure 2 is an under view of same.

Figure 3 represents in part section a hydraulic valve for the admission of oil under pressure to the hydraulic suspension system from an independent source.

Figure 4 is a section transverse to the direction of motion of the vehicle showing a replenisher for the automatic restoration of oil to the pressure system and also illustrating in greater detail the oil pressure reservoir and its connection to the plunger cylinder.

Figure 5 illustrates, similarly in section, a simplified construction of replenisher.

Referring to the figures generally $a^1$ is the hydraulic plunger or ram which carries the load; $b^1$ is the hydraulic cylinder; $c^1$ is a tubular axle forming part of the chassis construction and constituting the oil pressure reservoir D, the volume of the oil reservoir being determined by a cap or plug $c^3$ brazed into the tube $c^1$ and forming a pressure tight bulk head therein; $e^1$ is the communication duct between the oil pressure reservoir and the plunger cylinder; F is the face adapted to receive the valve box or replenisher fitting.

Referring now to the figures in greater detail, the axle tube $c^1$ is brazed into a lug $c^2$ (Figure 1) adapted to be bolted to the fore end of the chassis longitudinal members. The plunger cylinder $b^1$ forms part of a stamping, of which the lug portion $b^2$ is brazed or otherwise hermetically secured to the end of the tube $c^1$. The plunger $a^1$ which is a close mechanical fit in the cylinder $b^1$, and which can be furnished with hydraulic packing for the prevention of leakage, has formed at its lower end a head $a^2$ which bears on the blind end of the bored axle lug $g^1$. The axle lug $g^1$ which is conveniently a steel stamping, carries the axle $g^2$, part only of which is shown, the actuating arm $g^3$ adapted to be coupled to the steering mechanism, and the coupling arm $g^4$ which is connected by a link to a coupling arm on the corresponding head on the other side of the vehicle. The head selected for the purpose of illustration is that on the steering side of the car, that is, as ordinarily constructed in Great Britain, the off side or right hand.

A stiff spring $a^3$ is provided to cushion the plunger at the upper limit of its motion and a concertina-like leather dust guard $g^5$ is fitted between the axle lug $g^1$ and the facing $b^3$ at the head of the plunger cylinder $b^1$. The plunger cylinder $b^1$ and the axle lug $g^1$ are furnished with ferrules $b^4$ and $g^6$ respectively acting as a safety guard to tie the suspension motion at its lower limit and one or more leather washers $b^5$ may be provided to prevent shock in the event of the lower limit of the suspension motion being reached. Without this provision there are circumstances in which the wheel and axle assemblage might drop off and become detached from the car.

In Figure 3 the valve $h^1$ is adapted to be lifted by contact between the stem $h^2$ and the spigot $a^4$ forming part of the plunger $a^1$. The valve $h^1$ when lifted admits oil under pressure from the supply pipe $j^1$ by way of the fluted valve stem $h^2$ to the pressure system, of which the oil duct $e^1$ is shown in the figure. Oil under pressure is fed to the pipe $j^1$ from a mechanically driven pump and accumulator at a pressure considerably in excess of the normal pressure of the suspension system. The feed only takes place when the range of the suspension in the upward direction approaches within a pre-determined distance of its limit, the pre-determined distance depending upon the length of the valve stem $h^2$. The valve $h^1$ is restored to its closed position by the spring $h^3$ and the valve box $k$ is adapted to be bolted to the head of the plunger cylinder $b^1$, a hydraulic joint being made as indicated at $b^6$.

Referring now to Figure 4, in this figure the oil reservoir D and duct $e^1$ are shown in greater detail. A check nipple $e^2$ to which access is given by the plug $e^3$ is provided, in order to secure the necessary degree of damping and to perform the function commonly assigned to the fitting termed a "shock absorber". The degree of damping required varies according to the circumstances in which a car is used and the check nipple $e^2$ may be withdrawn by a screw driver inserted through the plug hole $e^3$ and replaced by a nipple having a larger or smaller aperture, as required. In place of the nipple $e^2$ the design may be varied and a needle valve fitted, in order that the required adjustment may be more readily carried out; in this case the duct $e^1$ is drilled out of line with the axis of the plunger cylinder so that the needle valve spindle will not foul the valve stem or plunger spigot.

In the type of replenisher illustrated in Figure 4 a push rod $m^1$ acts by its head $m^2$ on a piston $m^3$, which is restrained by a spring $m^4$ and spigot plate $m^5$. The disposition is such that when the plunger $a^1$ rises relatively above the position shown in the figure the piston $m^3$ becomes functionally operative and oil is forced from the upper part of the cylinder $n^1$ by way of the ducts $n^2$ and $n^3$ into the pressure system, fresh oil being taken in at the lower end of the cylinder $n^1$ by way of the ducts $n^4$, $n^5$, and $n^6$ from the oil reservoir $o^1$. The oil taken into the cylinder $n^1$ on the up-stroke of the piston $m^3$ is trapped by the suction valve $p^1$, $p^2$ which is shown as a tandem ball valve, and on the return of the piston under the influence of the spring $m^4$ the oil so taken in is circulated by way of the valve $p^3$ and the duct $n^2$ from the under to the upper side of the piston $m^3$ and the piston and push rod combination $m^1$, $m^2$, $m^3$ is restored to its initial position ready to become operative again in the event of the plunger $a^1$ exceeding the normal motion assigned to it. The oil reservoir $o^1$ is at atmospheric pressure and is readily filled through the cap $o^2$, a ventage such as indicated by a hole $o^3$ being provided in order to avoid the formation of a vacuum or partial vacuum when the oil is drawn off for the replenishment of the hydraulic system. In some cases it is preferable to entirely enclose the oil reservoir $o^1$ and to maintain a certain volume of compressed air in the upper part of the oil reservoir, which may be renewed by a tyre pump, a nipple fitting and valve being furnished for the purpose.

In Figure 5 a simplified form of replenisher is illustrated, in which the spigot $a^4$, forming part of the plunger $a^1$ is arranged to enter a closely fitting bush $q^1$ and whilst therein to act as a hydraulic pump compressing oil on the up stroke by way of the ducts $r^1$ and $r^2$ and the valve $s^1$ into the hydraulic pressure system and taking in fresh oil from the oil pressure reservoir through the duct $r^3$, the valve $s^2$ and the duct $r^1$ on the down stroke. The cap $q^2$ serves to retain the bush $q^1$ in position and holes are provided $q^3$ by which communication is established for the flow of oil when the spigot $a^4$ becomes operative in the manner described. The arrangement illustrated by Figure 5, though simpler than Figure 4, cannot be regarded as being as fully effective inasmuch as the area of the spigot $a^4$ is deducted from the operative area of the plunger on the return stroke for the period during which fresh oil is being taken into the system through the duct $r^3$. Under these conditions the spring $a^3$ in Figure 1 may have to be relied on to prevent the suspension hanging up and thus a far heavier, stiffer spring is necessary than when the system described with reference to Figure 4 is adopted.

Having now described my invention, what I claim as new and desire to secure by Letters Patent is:—

1. An elastic road wheel suspension mechanism including a closed reservoir of relatively large capacity filled with liquid, a ram of relatively smaller dimensions as compared with the reservoir in open communication with said reservoir and on which ram said vehicle rests, said liquid acting as the elastic medium in said mechanism.

2. Vehicle road wheel suspension mechanism in which liquid in compression inside closed reservoirs is employed as the elastic medium, and in which the main weight of the vehicle is sustained by rams whose cylinders are respectively in communication with the said reservoirs.

3. Vehicle road wheel suspension mechanism in which liquid in compression inside closed reservoirs is employed as the elastic medium, and in which the main weight of the vehicle is sustained by rams whose cylinders are respectively in communication with the said reservoirs by way of restricted passages.

4. Vehicle road wheel suspension mechanism in which liquid in compression inside a closed reservoir is employed as the elastic medium, a ram cylinder communicating with said reservoir, a tubular member external to and sliding on said ram cylinder, a road wheel axle mounted on the tubular member, and a ram carried by the tubular member and operating in the ram cylinder, said tubular member functioning to relieve the ram of all forces other than direct thrust.

5. Mechanism of the kind defined by claim 4 in which the tubular member is rotatably mounted on the ram cylinder to permit the wheel axle to function for a steering wheel.

6. Vehicle road wheel suspension mechanism of the kind defined by claim 1 in which a tubular member, external to and sliding on a ram cylinder, carries the ram and the road wheel axle relieving the ram of all forces other than direct thrust.

7. Vehicle road wheel suspension mechanism of the kind defined by claim 2 in which a tubular member, external to and sliding on the ram cylinder, carries the ram and the road wheel axle relieving the ram of all forces other than direct thrust.

8. Vehicle road wheel suspension mechanism of the kind defined by claim 1, in which the liquid pressure reservoirs are embodied in the form of a transverse tubular member forming a part of a chassis structure, the said tubular member carrying at each extremity a hydraulic cylinder relative to which the road wheel axle is slidable.

9. Vehicle road wheel suspension mechanism as defined by claim 2 in which the liquid pressure reservoirs are embodied in the form of a transverse tubular member forming a part of the vehicle chassis, the ram cylinders being mounted at the ends of the tubular member, and road wheel axles slidably mounted on said cylinders.

10. Vehicle road wheel suspension mechanism as defined by claim 3 in which the liquid pressure reservoirs are embodied in the form of a transverse tubular member forming a part of the vehicle chassis, the ram cylinders being mounted at the ends of the tubular member, and road wheel axles slidably mounted on said cylinders.

11. Vehicle road wheel suspension mechanism including a liquid reservoir formed by a transverse tubular member which is part of the vehicle chassis, a hydraulic cylinder secured to one end of the tubular member and having its interior communicating with said reservoir, a second tubular member mounted on the exterior of said cylinder and carrying a wheel axle, and a ram secured to the second tubular member and slidably engaging said cylinder.

12. Vehicle road wheel suspension mechanism of the kind defined by claim 2 including means for replenishing the liquid in the said reservoirs operated by the relative movement of the said rams and cylinders when the said movement passes a prefixed point.

13. Vehicle road wheel suspension mechanism of the kind defined by claim 3 including means for replenishing the liquid in the said reservoirs operated by the relative movement of the said rams and cylinders when the said movement passes a prefixed point.

14. Vehicle road wheel suspension mechanism in which liquid in compression inside closed reservoirs is employed as the elastic medium, and in which the main weight of the vehicle is sustained by rams whose cylinders are respectively in communication with the said first and second reservoirs, means for replenishing the liquid in the said reservoirs operated by the relative movement of the said rams and cylinders when the said movement passes a prefixed point, and auxiliary pistons operated by the said rams to replenish the liquid in the respective reservoirs each from an external low pressure source.

In testimony whereof I have signed my name to this specification.

FREDERICK WILLIAM LANCHESTER.